(12) United States Patent
Mehlem et al.

(10) Patent No.: US 8,952,088 B2
(45) Date of Patent: *Feb. 10, 2015

(54) TREAD FOR HEAVY VEHICLE TIRES

(75) Inventors: Jeremey J. Mehlem, Mauldin, SC (US); Jesse J. Arnold, Simpsonville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/265,581

(22) PCT Filed: Apr. 29, 2009

(86) PCT No.: PCT/US2009/042104
§ 371 (c)(1),
(2), (4) Date: Oct. 21, 2011

(87) PCT Pub. No.: WO2010/126500
PCT Pub. Date: Nov. 4, 2010

(65) Prior Publication Data
US 2012/0234441 A1    Sep. 20, 2012

(51) Int. Cl.
| | |
|---|---|
| B60C 1/00 | (2006.01) |
| C08L 9/00 | (2006.01) |
| C08L 9/06 | (2006.01) |
| C08K 3/36 | (2006.01) |
| C08K 5/01 | (2006.01) |
| C08K 5/44 | (2006.01) |
| C08K 5/548 | (2006.01) |
| C08L 7/00 | (2006.01) |

(52) U.S. Cl.
CPC .............. B60C 1/0016 (2013.04); *C08K 3/36* (2013.01); *C08K 5/01* (2013.01); *C08K 5/44* (2013.01); *C08K 5/548* (2013.01); *C08L 7/00* (2013.01); C08L 9/00 (2013.01); C08L 9/06 (2013.01); *B60C 2200/06* (2013.04)
USPC ........................................ 524/493; 523/157

(58) Field of Classification Search
CPC .............. C08L 9/00; C08L 9/06; C08L 7/00; C08K 5/44; C08K 5/548; C08K 3/36; B60C 1/0016
USPC ................. 524/493; 523/157; 152/151, 209.1
See application file for complete search history.

(56) References Cited

U.S. PATENT DOCUMENTS

| | | | |
|---|---|---|---|
| 3,781,250 A * | 12/1973 | Wolpers | 525/346 |
| 3,861,439 A * | 1/1975 | Boileau | 152/209.1 |
| 5,227,425 A | 7/1993 | Rauline | |
| 5,396,940 A | 3/1995 | Segatta et al. | |
| 5,534,592 A | 7/1996 | Halasa | |
| 6,046,266 A | 4/2000 | Sandstrom et al. | |
| 6,269,857 B1 * | 8/2001 | Kanai et al. | 152/517 |
| 6,350,807 B1 | 2/2002 | Blok | |
| 6,369,151 B1 | 4/2002 | Mizuno et al. | |
| 6,536,492 B2 * | 3/2003 | Vasseur | 152/450 |
| 7,096,903 B2 | 8/2006 | Weydert et al. | |
| 7,300,970 B2 * | 11/2007 | Durel et al. | 524/493 |
| 2004/0181000 A1 | 9/2004 | Araujo-Da-Silva et al. | |
| 2005/0016651 A1 | 1/2005 | Durel et al. | |
| 2005/0250883 A1 | 11/2005 | Shibata et al. | |
| 2007/0293619 A1 * | 12/2007 | Jacoby et al. | 524/493 |

FOREIGN PATENT DOCUMENTS

EP      738613 A1 * 10/1996

OTHER PUBLICATIONS

Taikum et al., "Silane-rubber coupling in sulfur, peroxide and metal oxide curing systems," Rubber World, vol. 230, Issue 5, Table 1, p. 30-39 (2004).*
Flörke et al., "Silica", Section 7.4, Ullman's Encyclopedia of Industrial Chemistry, pp. 489-470 (2008).*
X 50-S Product Information. Datasheet [online]. Evonik Industries AG (2012) [retrieved on Nov. 19, 2013]. Retrieved from the Internet: <URL: http://www.rubber-silanes.com/sites/dc/Downloadcenter/Evonik/Product/Rubber-Silanes/Produktinformationen/PI%20321%20X50S_en%200909.pdf>.*
International Search Report and Written Opinion for PCT/US09/42104 dated Apr. 29, 2009.

* cited by examiner

*Primary Examiner* — Susannah Chung
*Assistant Examiner* — Josephine Chang
(74) *Attorney, Agent, or Firm* — Frank J. Campigotto

(57) ABSTRACT

A heavy vehicle tire tread constituted from a material based upon a rubber composition, the composition comprising, per 100 parts by weight of elastomer, between 35 and 60 phr of a solution polymerized styrene-butadiene rubber having a styrene content of between 10 wt. % and 35 wt. % and between 35 and 60 phr of a polybutadiene. The composition may further include between 45 and 110 phr of silica and between $(1.94 \times 10^{-3}/n)(S)$ and $(2.55 \times 10^{-3}/n)(S)$ moles of a sulfur-containing organosilicon compound as a silane coupling agent per 1 kg of the silica, wherein n is a number of silicon atoms in a molecule of the silane coupling agent and S is a CTAB surface area in $m^2/g$ of the silica. The rubber composition may be cured with a sulfur curing system comprising a sulfenamide accelerator and between 0.3 and 0.8 phr of free sulfur, wherein a ratio of the sulfenamide accelerator and the sulfur is between 2 and 7.

20 Claims, No Drawings

TREAD FOR HEAVY VEHICLE TIRES

BACKGROUND OF THE INVENTION

1. Field of the Invention

This invention relates generally to tire treads and more specifically, to heavy vehicle tire treads having a high silica content.

2. Description of the Related Art

Tire wear is of concern to those who must purchase tires because the greater the tire wear, the more expensive it is to operate a vehicle due to the expense of replacing worn tires. This is of more concern to those who operate large fleets of vehicles such as truck fleets or bus lines.

Improving tire wear is often a trade off that must be made against another valued physical property of a tire such as, for example, rolling resistance. The greater the rolling resistance of a tire, the higher the fuel consumption may be and the higher the operating costs.

Selection of reinforcing materials can have an impact on the physical properties of tires. Carbon black has been used for many years as a reinforcement filler of choice. Silica and other so-called white filler have been used also, often providing more desired characteristics than can be achieved with carbon black. An example of silica use as a filler is disclosed in U.S. Pat. No. 5,227,425.

There is a need for improved materials to provide an optimum combination of tire characterizations.

SUMMARY OF THE INVENTION

Particular embodiments of the present invention include a heavy vehicle tire tread constituted from a material based upon a rubber composition, the composition comprising, per 100 parts by weight of elastomer, between 35 and 60 phr of a solution polymerized styrene-butadiene rubber having a styrene content of between 10 wt. % and 35 wt. % and between 35 and 60 phr of a polybutadiene. The composition may further include between 45 and 110 phr of silica and between $(1.94 \times 10^{-3}/n)(S)$ and $(2.55 \times 10^{-3}/n)(S)$ moles of a sulfur-containing organosilicon compound as a silane coupling agent per 1 kg of the silica, wherein n is a number of silicon atoms in a molecule of the silane coupling agent and S is a CTAB surface area in $m^2/g$ of the silica. The rubber composition may be cured with a sulfur curing system comprising a sulfenamide accelerator and between 0.3 and 0.8 phr of free sulfur, wherein a ratio of the sulfenamide accelerator and the sulfur is between 2 and 7.

Another embodiments includes a heavy vehicle tire tread constituted from a material based upon a rubber composition, the composition comprising, per 100 parts by weight of elastomer, a solution polymerized styrene-butadiene rubber having a styrene content of between 10 wt. % and 35 wt. % and between 45 and 110 phr of silica and between $(1.94 \times 10^{-3}/n)(S)$ and $(2.55 \times 10^{-3}/n)(S)$ moles of a sulfur-containing organosilicon compound as a silane coupling agent per 1 kg of the silica, wherein n is a number of silicon atoms in a molecule of the silane coupling agent and S is a CTAB surface area in $m^2/g$ of the silica. The composition may further include a sulfur curing system comprising a sulfenamide accelerator and between 0 and 0.8 phr of free sulfur, wherein a ratio of the sulfenamide accelerator and the sulfur is between 2 and 7 unless the free sulfur is less than 0.2 phr, wherein the sulfenamide accelerator is between 2.2 and 3.2 phr.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include rubber compositions and articles, including tire treads, that are reinforced with a silica filler with little or no carbon black filler. Those embodiments that include "heavy vehicle tire treads" are particularly suitable for use on "heavy vehicles" such as, for example, truck tires, bus tires, subway train tires, tractors, trailers, aircraft tires, agricultural, earthmover and other off-the-road (OTR) tires. The "heavy vehicle tire treads" as used herein may include both the treads of new tires, the treads on tires that have been re-treaded and the tread bands (cured or uncured) that can be applied to buffed tires during the re-tread process. Therefore particular embodiments of the present invention are not directed to passenger car tires and other light duty tires.

While many of the embodiments disclosed below are directed to treads, this invention should not be considered to be so limited. Indeed the invention is useful for many applications that require rubber compositions having the physical properties disclosed below including, for example, good wear properties.

Generally truck tires and other heavy duty tires are manufactured using a rubber composition that is reinforced with carbon black. While it has been known to use silica as a filler in heavy duty tires, carbon black is typically used because the carbon black filler has provided a tire having better wear properties than those that contain silica. A disadvantage of using carbon black is that carbon black is produced from petroleum, a natural resource that is becoming more costly and less available. Therefore it would be advantageous to remove carbon black from heavy vehicle tires and replace it with silica to reduce the consumption of petroleum.

Heavy vehicle tire treads that are included in particular embodiments of the present invention are constituted from rubber compositions of generally highly unsaturated diene elastomers, reinforced with silica and a proportionate amount of silane coupling agent and cured with a sulfur curing system. The inventors have discovered that if such rubber compositions are cured with just a small amount of sulfur (or in some embodiments, with no sulfur) and a proportionate amount of a sulfenamide accelerator, the resulting heavy vehicle tire tread (or other article) has wear properties that are as good as or better than a heavy duty tire reinforced only with carbon black.

Heavy vehicles tires can sometimes be classified as to their use. For example, truck tires may be classified as drive tires (those that are powered by the truck engine) and steer tires (those that are used to steer the truck). The tires on the trailer of a tractor-trailer rig are also classified separately. While embodiments of the present invention are recognized as being suitable for each type of heavy vehicle tires, other embodiments are especially suited and limited to the drive tires of a tractor as used in a tractor-trailer rig.

Particular embodiments are also limited to relatively thin treads, e.g., treads that are between 10 and 19 mm thick as measured from the bottom of the tread groove to the top surface of the tread. Alternatively the treads may have a thickness of between 12 and 18 mm, between 13 and 18 mm or between 12 and 18 mm. Particular embodiments include any of the tractor-trailer tires with the relatively thin treads or alternatively, just the tractor steer tires with relatively thin treads. These tread measurements are measured before being worn through use on a truck, i.e., as new or unused treads. Such treads would also include those placed on a tire carcass during the retreading process as well as the new tread bands that are to be bonded to a tire carcass during the retreading process.

Particular embodiments of the present invention include heavy vehicle tire treads constituted from a material based upon a rubber composition reinforced with silica. The term "based upon" as used herein recognizes that the treads or other rubber articles are made of vulcanized or cured rubber compositions that were, at the time of their assembly, uncured. The cured rubber composition is therefore "based upon" the uncured rubber composition. In other words, the cross-linked rubber composition is based upon the cross-linkable rubber composition.

The useful elastomers of the rubber composition disclosed herein include highly unsaturated diene elastomers. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type do not fall within the preceding definition, and may in particular be described as "essentially saturated" diene elastomers (low or very low content of units of diene origin, i.e., less than 15 mol. %). Particular embodiments of the present invention include no essentially saturated diene elastomers.

Within the category of essentially unsaturated diene elastomers are the highly unsaturated diene elastomers, which are understood to mean in particular diene elastomers having a content of units of diene origin (conjugated dienes) that is greater than 50 mol. %. Particular embodiments of the present invention may include not only no essentially saturated diene elastomers but also no essentially unsaturated diene elastomers that are not highly unsaturated.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers. The polyisoprenes include synthetic cis-1,4 polyisoprene, which may be characterized as possessing cis-1,4 bonds at more than 90 mol. % or alternatively, at more than 98 mol. %.

Also suitable for use in particular embodiments of the present invention are rubber elastomers that are copolymers and include, for example, butadiene-styrene copolymers (SBR), butadiene-isoprene copolymers (BIR), isoprene-styrene copolymers (SIR) and isoprene-butadiene-styrene copolymers (SBIR) and mixtures thereof.

It should be noted that any of the highly unsaturated elastomers may be utilized in particular embodiments as a functionalized elastomer. These elastomers can be functionalized by reacting them with suitable functionalizing agents prior to or in lieu of terminating the elastomer. Exemplary functionalizing agents include, but are not limited to, metal halides, metalloid halides, alkoxysilanes, imine-containing compounds, esters, ester-carboxylate metal complexes, alkyl ester carboxylate metal complexes, aldehydes or ketones, amides, isocyanates, isothiocyanates, imines, and epoxides. These types of functionalized elastomers are known to those of ordinary skill in the art. While particular embodiments may include one or more of these functionalized elastomers, other embodiments may include one or more of these functionalized elastomers mixed with one or more of the non-functionalized highly unsaturated elastomers.

Particular embodiments of rubber composition disclosed herein include between 35 and 60 parts per hundred weight of elastomer in the rubber composition (phr) of a solution polymerized styrene-butadiene rubber. Alternatively, the styrene-butadiene content of the rubber composition may be between 40 and 55 phr, 45 and 55 phr or 40 and 50 phr. Other embodiments include up to 100 phr of the styrene-butadiene rubber or alternatively, between 60 and 100 phr, 60 and 90 phr or 60 and 80 phr. The styrene-butadiene may be characterized as having a styrene content of between 10 and 35 wt. % or alternatively, between 15 and 30 wt. %, between 20 and 30 wt. % or between 22 and 27 wt. %.

The styrene-butadiene may further be characterized as having a glass transition temperature Tg of between $-65°$ C. and $0°$ C. as determined by differential scanning calorimetry (DSC) according to ASTM E1356 or alternatively, between $-48°$ C. and $0°$ C., $-35°$ C. and $-10°$ C., $-30°$ C. and $-15°$ C. or $-25°$ C. and $-15°$ C. Furthermore, the vinyl content of the butadiene part of the styrene-butadiene may be between 50 and 80 wt. % or alternatively between 55 and 65 wt. % based on the total butadiene content of the styrene-butadiene. Alternatively the vinyl content may range between 20 and 30 wt. %.

In addition to the styrene-butadiene component, the rubber composition disclosed herein further includes between 35 and 60 phr of a polybutadiene component. Alternatively, the polybutadiene content of the rubber composition may be between 40 and 55 phr, 45 and 55 phr or 40 and 50 phr. In particular embodiments, the polybutadiene content may be between 10 and 40 phr or 20 and 40 phr. The polybutadiene may be characterized as having at least 90 wt. % cis 1,4-content and having a Tg of less than $-100°$ C. or alternatively, between $-108°$ C. and $-103°$ C.

Particular embodiments of the present invention may further include as part of the rubber composition disclosed herein no more than 30 phr natural rubber, synthetic polyisoprene rubber or combinations thereof. Alternatively, the amount of such elastomers may range between 0 and 25 phr, 0 and 20 phr, 0 and 10 phr or 0 and 5 phr. Many embodiments include no other elastomer components other than a styrene-butadiene rubber and a polybutadiene rubber. The elastomeric content of many of the embodiments include the combination of only one styrene-butadiene rubber and/or only one polybutadiene rubber and others may include only styrene-butadiene rubber.

The silica used in particular embodiments of the rubber composition may be any reinforcing silica known to one having ordinary skill in the art, in particular any precipitated or pyrogenic silica having a BET surface area and a specific CTAB surface area both of which are less than 450 $m^2/g$ or alternatively, between 30 and 400 $m^2/g$. Particular embodiments include a silica having a CTAB of between 80 and 200 $m^2/g$, between 100 and 190 $m^2/g$, between 120 and 190 $m^2/g$ or between 140 and 180 $m^2/g$. The CTAB specific surface area is the external surface area determined in accordance with Standard AFNOR-NFT-45007 of November 1987.

Particular embodiments of the rubber compositions constituting the heavy vehicle tire treads have a BET surface area of between 60 and 250 $m^2/g$ or alternatively, of between 80 and 200 m²/g. The BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987).

The silica used in particular embodiments may be further characterized as having a dibutylphthlate (DHP) absorption value of between 100 and 300 ml/100 g or alternatively between 150 and 250 ml/100 g.

Highly dispersible precipitated silicas (referred to as "HD") are used exclusively in particular embodiments of the disclosed rubber composition, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

Particular embodiments of the present invention include little or no carbon black or other reinforcement fillers. Particular embodiments that include adding a silane coupling agent that is commercially available on a carbon black substrate do include up to about 50 wt. % of the commercial coupling agent weight as carbon black. The rubber compositions having such amounts of carbon black may be characterized as having essentially no carbon black.

The amount of silica added to the rubber composition disclosed herein is between 45 and 110 phr or alternatively between 45 and 80 phr, between 45 and 70 phr, between 45 and 65 phr or between 50 and 70 phr.

In addition to the silica added to the rubber composition, a proportional amount of a silane coupling agent is also added to the rubber composition. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer; which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

The silane coupling agent is added to the composition based upon the moles of coupling agent per m²/g of CTAB surface area of 1 kg of the silica in the rubber composition. Per m²/g of CTAB surface area of 1 kg of the silica in the rubber composition, the silane coupling agent is added in an amount of between $1.94\times10^{-3}/n$ and $2.55\times10^{-3}/n$ moles of silane coupling agent, wherein n is the number of silicon atoms in the silane molecule. Alternatively the amount may be between $2.12\times10^{-3}/n$ and $2.42\times10^{-3}/n$ moles of silane coupling agent per m²/g of CTAB surface area of 1 kg of the silica. These determinations for the amount of silane coupling agent to add to the rubber composition are based on maintaining about the same amount of silane coupling agent on the surface of the silica based upon the CTAB surface area of the silica.

Therefore, for an exemplary embodiment of a rubber composition having a silica with a CTAB surface area of 200 m²/g and using a silane coupling agent molecule having two atoms of silicon, the amount of silicon coupling agent that may be added may be determined to be between:

$$(1.94\times10^{-3}/2)(200)=0.194 \text{ moles and}$$

$$(2.55\times10^{-3}/2)(200)=0.255 \text{ moles}$$

for each 1 kg of silica added to the rubber composition. If the molecular weight of the coupling agent is 425 g/mole, then the amount of coupling agent added to the rubber composition of this example may be between about 82 and 108 g of coupling agent per 1 kg of silica in the rubber composition.

Any of the organosilicon compounds that contain sulfur and are known to one having ordinary skill in the art are useful for practicing embodiments of the present invention. Examples of suitable silane coupling agents having two atoms of silicon in the silane molecule include 3,3'-bis(triethoxysilylpropyl) disulfide and 3,3'-bis(triethoxy-silylpropyl) tetrasulfide. Both of these are available commercially from Degussa as X75-S and X50-S respectively, though not in pure form. Degussa reports the molecular weight of the X50-S to be 532 g/mole and the X75-S to be 486 g/mole. Both of these commercially available products include the active component mixed 50-50 by weight with a N330 carbon black. Other examples of suitable silane coupling agents having two atoms of silicon in the silane molecule include 2,2'-bis(triethoxysilylethyel) tetrasulfide, 3,3'-bis(tri-t-butoxysilylpropyl) disulfide and 3,3'-bis(di t-butylmethoxysilylpropyl) tetrasulfide. Examples of silane coupling agents having just one silicon atom in the silane molecule include, for example, 3,3'(triethoxysilylpropyl) disulfide and 3,3' (triethoxy-silylpropyl) tetrasulfide.

The rubber compositions disclosed herein are cured with a sulfur curing system that includes free sulfur and a sulfenamide accelerator in a proportional amount. Suitable free sulfur includes, for example, pulverized sulfur, rubber maker's sulfur, commercial sulfur, and insoluble sulfur. The amount of free sulfur included in the rubber composition may range between 0.2 and 0.8 phr or alternatively between 0.3 and 0.7 phr, between 0.3 and 0.6 phr, between 0.3 and 0.5 phr or between 0.25 and 0.45 phr. Some embodiments include no free sulfur added in the curing system.

The sulfenamide accelerator is added in a proportional amount to the amount of free sulfur added in the curing system. The ratio of the weight of sulfenamide accelerator to the weight of free sulfur may range between 2 and 7 or alternatively between 2 and 6 or 3 and 5. Alternatively, for those embodiments having little or no sulfur, the amount of sulfenamide accelerator is added in an amount of between 2 and 4 phr or alternatively between 2.2 and 3.2 phr, 2.4 and 3.0 phr or 2.6 and 2.9 phr.

Sulfenamide accelerators are well known in the art. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Particular embodiments utilize CBS solely as the sulfenamide accelerator.

Particular embodiments of the rubber composition disclosed herein include no processing oil. Such oils are well known to one having ordinary skill in the art, are generally extracted from petroleum, and are classified as being paraffinic, aromatic or naphthenic type processing oil and including MES and TDAE oils. Some embodiments of the rubber composition may include an elastomer, such as a styrene-butadiene rubber, that has been extended with one or more such processing oils but such oil is limited in the rubber composition as being no more than 10 phr of the total elastomer content of the rubber composition or alternatively, no more than 8 phr, no more than 6 phr or no more than 4 phr. Likewise other rubber compositions in accordance with the present invention that do not include an extended elastomer may include no more than the same amount of processing oils as might be contained in an extended elastomer as noted above.

Particular embodiments of the rubber composition disclosed herein include no plasticizing resins. Such resins are well known to those having ordinary skill in the art and are generally hydrocarbon based, often being petroleum based.

Other additives can be added to the rubber composition disclosed herein as known in the art. Such additives may include, for example, some or all of the following: anti-degradants, antioxidants, fatty acids, waxes, stearic acid, zinc oxide and other accelerators. Examples of antidegradants and antioxidants include 6PPD, 77PD, IPPD and TMQ and may be added to rubber compositions in an amount of from 0.5 and 5 phr. Zinc oxide may be added in an amount of between 1 and 6 phr or 2 and 4 phr. Waxes may be added in an amount of between 1 and 5 phr.

Accelerators are used to control the time and/or temperature required for vulcanization and to improve the properties of the cured rubber composition. As noted above, the primary accelerator in the rubber composition disclosed herein is a sulfenamide, which is added in an amount that is proportional to the amount of sulfur added. Combinations of accelerators are often useful to improve the properties of the cured rubber composition and the particular embodiments include the addition of secondary accelerators.

Particular embodiments include the use of a moderately fast accelerator such as, for example, diphenylguanidine (DPG), triphenyl guanidine (TPG), diorthotolyl guanidine (DOTG), o-tolylbigaunide (OTBG) or hexamethylene tetra-mine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and ben-zothiazoles; and the ultra-accelerators: thiurams, xanthates, dithiocarbamates and dithiophosphates.

The invention is further illustrated by the following examples, which are to be regarded only as illustrations and not delimitative of the invention in any way. The properties of the compositions disclosed in the examples were evaluated as described below.

Moduli of elongation (MPa) were measured at 10% (MA10) and 100% (MA 100) at a temperature of 23° C. based on ASTM Standard D412 on dumb bell test pieces. The measurement were taken in the second elongation; i.e., after an accommodation cycle. These measurements are secant moduli in MPa, based on the original cross section of the test piece.

Hysteresis losses (HL) were measured in percent by rebound at 60° C. at the sixth impact in accordance with the following equation:

$$HL(\%)=100(W_0-W_1)/W_1,$$

where $W_0$ is the energy supplied and $W_1$ is the energy restored.

Dynamic characteristics of the materials were measured on an MTS 831 Elastomer Test System in accordance with ASTM D5992. The response of a sample of vulcanized material (cylindrical test piece of a thickness of 4 mm and a section of 400 $mm^2$), subjected to an alternation single sinusoidal shearing stress, at a frequency of 10 Hz and at 80° C., is recorded. Scanning is effected at an amplitude of deformation of 0.1 to 50% (outward cycle), then of 50% to 0.1% (return cycle). The shear modulus G* at 10% deformation in MPa and the maximum value of the tangent of the loss angle tan delta (max tan δ) was determined during the return cycle.

The tire testing results are provided as relative performance indices, such results being relative to a reference index 100 characterizing a "control" tire. Therefore a performance index greater than this base 100 indicates that a performance for a particular tire is superior to that of the corresponding "control" tire.

The rolling resistance of each of the tires tested was measured by running on a test drum, at an ambient temperature of 25° C., under a load of 2800 kg and at a speed of 90 km/h, the internal pressure of the tire being 8.6 bar.

The wear resistance or endurance of each tire was determined by means of a relative wear index which is a function of the height of rubber remaining, after running the tires on the drive axel of a truck on a winding road circuit, for a total of 32,000 km. This relative wear index was obtained by comparing the height of rubber remaining on a tread according to the invention with the height of rubber remaining on a "control" tread, which by definition has a wear index of 100.

Traction was tested by mounting the tire on a truck having an instrumented drive axle. The tires were tested at ambient temperature conditions with 1.5 mm nominal water depth on the road surface. The conditions of the test were on polished concrete at 32 and 64 km/h and on asphalt at 32 and 97 km/h.

During each test, a braking force (Fx) was applied and measured locking the wheel rotation, i.e., the wheel stopped rotating. Slip occurs when, at the footprint, the tire's angular velocity of the tire (O) is less than its free-rolling angular velocity (Oo). The slip ratio (SR) generally represents the difference between the two velocities, and may be expressed as SR=(O/Oo)−(Oo/Oo). For example, when the tire becomes locked, the rotational velocity is zero and the slip ratio is −1.

During the test, Mu values for were calculated for particular tire angular velocities (slip ratios) until the tire became locked due to braking forces. Mu is determined by dividing the braking force by the constant vertical load applied to each tire. Using the average Mu value between 5% and 45% slip for each tire, the Mu values for each of the tires were normalized by dividing each by the average Mu value for the Witness 1 tire.

EXAMPLE 1

This example provides comparisons between treads constituted from a traditional carbon black filled rubber composition (W1), a traditional silica filled rubber composition (W2) and treads constituted from exemplary silica filled rubber compositions in accordance with the present invention.

Two thermochemical stages were used to prepare the rubber compositions F1 through F5 having the material components shown in Table 1 (amounts shown in phr). First, the elastomers, ⅔ of the silica and all of the other ingredients except for the remaining silica and vulcanization agents were introduced into a 50 liter Banbury-type mixer in the amounts shown in Table 1. After approximately 30 seconds, the remaining ⅓ of the silica was added and the material was mixed until a temperature was reached between 145° C. and 170° C. The mixture was then dropped and cooled to a temperature below 100° C.

TABLE 1

Rubber Formulations and Physical Properties

|  | W1 | W2 | F1 | F2 | F3 | F4 | F5 |
|---|---|---|---|---|---|---|---|
| Formulations | | | | | | | |
| Natural Rubber | 60 | 20 | | | 20 | 20 | |
| Styrene-Butadiene | | 34 | 50 | 50 | 40 | 40 | 100 |
| Polybutadiene | 40 | 46 | 50 | 50 | 40 | 40 | |
| Silica | | 55 | 56 | 68 | 56 | 62 | 56 |
| Carbon Black (N234) | 54 | | | | | | |
| Processing Oil (MES) | | | | | | 4* | |
| Coupling Agent (X50-S)† | | 8 | 11.2 | 13.6 | 11.2 | 12.4 | 11.2 |
| Paraffin | 1 | 1 | 1 | 1 | 1 | 1 | 1 |
| Zinc Oxide | 3 | 2.5 | 3 | 3 | 3 | 3 | 3 |
| Sulfur | 1.1 | 1.3 | 0.4 | 0.4 | 0.4 | 0.45 | 0 |
| Sulfenamide Acc. | 1.1 | 0.6 | 1.85 | 1.4 | 1.85 | 1.85 | 2.8 |
| Stearic Acid | 1.5 | 2 | 2.5 | 2.5 | 2.5 | 2.5 | 2.5 |
| Antidegradants | 2 | 3 | 2.5 | 2.5 | 2.5 | 2.5 | 2.5 |
| Other Accelerators | 0 | 1.45 | 0.78 | 1.95 | 0.78 | 1.64 | |
| Resins | 3.55 | | | | | | |
| Physical Properties | | | | | | | |
| MA10 | 5.6 | 6.3 | 6.5 | 9.4 | 6.7 | 7.8 | 7.7 |
| MA100 | 2.0 | 2.2 | 2.4 | 2.8 | 2.0 | 2.5 | 2.1 |
| Max Tan Delta | 0.19 | 0.077 | 0.186 | 0.210 | 0.20 | 0.20 | 0.205 |
| Hysteresis Loss (%) | 30.5 | 19.7 | 31.1 | 33.1 | 32.3 | 31.0 | 34.1 |
| Tire Wear | 100 | 85 | 117 | 125 | | 110 | 92 |
| Rolling Resistance | 100 | 112 | 102 | 102 | | | 99 |
| Traction | 100 | 108 | 111 | 111 | | | 114 |

*The styrene-butadiene was an oil extended elastomer with 10 phr of MES processing oil, based on SBR content.
†The coupling agent is only 50 wt. % as shown of active ingredient and 50 wt. % N330 carbon black.

The silica used in the rubber compositions of Table 1 was ZEOSIL 1165, a highly dispersible silica available from Rhodia. The styrene-butadiene rubbers, except for F5, had a Tg of −20° C. while the styrene-butadiene used in F5 had a Tg of −65° C.

The polybutadiene had a Tg of −105° C. and a cis 1,4-content of 93%. The coupling agent was X50-S, available from Degussa, which is a 50-50 wt. % blend of 3,3'-bis (triethoxysilylpropyl) polysulfide (3.70 sulfurs) and N330 carbon black. Therefore, the amount of actual active coupling agent shown in Table 1 is only 50 wt. % of the amount shown, i.e., only 50 wt. % is the active ingredient 3,3'-bis(triethoxysilylpropyl) polysulfide.

The sulfenamide accelerator was n-cyclohexyl-2-benzothiazole sulfenamide (CBS) with an additional accelerator added as diphenylguanidine (DPG) as shown in Table 1. The resins added to the witness W1 were a processing aid and reinforcing resins as known to one having ordinary skill in the art.

In the second thermochemical stage, the cooled mixture was transferred to a mill having two cylinders that operated at a speed of 30 RPM. The vulcanizing agents were added and mixing continued until the vulcanizing agents were well dispersed. The rubber compositions were rolled into sheets and cured for the 30 minutes at a temperature of 150° C. for all the materials. The cured sheets were then cut into testing pieces suitable for the testing methods utilized to determine the physical characteristics of the examples.

For the tire testing, tires were produced having treads made of the rubber compounds shown in Table 1. Testing was conducted as described above with the test results shown in Table 1.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A heavy vehicle tire tread constituted wholly from a material based upon a rubber composition, the composition comprising, per 100 parts by weight of elastomer:
   a solution polymerized styrene-butadiene rubber having a styrene content of between 10 wt. % and 35 wt. %;
   between 45 and 110 phr of silica and between $(2.12\times10^{-3}/n)(S)$ and $(2.55\times10^{-3}/n)$ (S) moles of a sulfur-containing organosilicon compound as a silane coupling agent per 1 kg of the silica, wherein n is a number of silicon atoms in a molecule of the silane coupling agent and S is a CTAB surface area in $m^2/g$ of the silica;

a sulfur curing system comprising a sulfenamide accelerator and between 0 and 0.8 phr of free sulfur, wherein a ratio of the sulfenamide accelerator and the sulfur is between 2 and 7 unless the free sulfur is less than 0.2 phr, wherein the sulfenamide accelerator is between 2.2 and 3.2 phr, wherein the rubber composition includes essentially no carbon black.

2. The heavy vehicle tire tread of claim 1, wherein the rubber composition further comprises:

between 10 and 40 phr of a polybutadiene.

3. The heavy vehicle tire tread of claim 1, wherein the tread is a truck tire tread having a thickness of between 10 mm and 19 mm before being worn.

4. A heavy vehicle tire tread constituted wholly from a material based upon a rubber composition, the composition comprising, per 100 parts by weight of elastomer:

between 35 and 60 phr of a solution polymerized styrene-butadiene rubber having a styrene content of between 10 wt. % and 35 wt. %;

between 35 and 60 phr of a polybutadiene;

between 45 and 110 phr of silica and between $(2.12\times10^{-3}/n)(S)$ and $(2.55\times10^{-3}/n)(S)$ moles of a sulfur-containing organosilicon compound as a silane coupling agent per 1 kg of the silica, wherein n is a number of silicon atoms in a molecule of the silane coupling agent and S is a CTAB surface area in $m^2/g$ of the silica;

a sulfur curing system comprising a sulfenamide accelerator and between 0.3 and 0.8 phr of free sulfur, wherein a ratio of the sulfenamide accelerator and the sulfur is between 2 and 7, wherein the rubber composition comprises less than 20 phr of carbon black.

5. The heavy vehicle tire tread of claim 4, wherein the rubber composition further comprises between 0 and 30 phr of a polyisoprene rubber.

6. The heavy vehicle tire tread of claim 5, wherein the polyisoprene is natural rubber.

7. The heavy vehicle tire tread of claim 4, wherein the rubber composition further comprises less than 10 phr of a processing oil.

8. The heavy vehicle tire tread of claim 7, wherein the rubber composition comprises no more than 1 phr of the processing oil.

9. The heavy vehicle tire tread of claim 4, wherein the styrene content of the styrene-butadiene rubber is between 20 wt. % and 30 wt. %.

10. The heavy vehicle tire tread of claim 4, wherein the Tg of the styrene-butadiene rubber is between $-25°$ C. and $-15°$ C.

11. The heavy vehicle tire tread of claim 4, wherein a butadiene part of the styrene-butadiene rubber has a vinyl content of between 50 wt. % and 80 wt. %.

12. The heavy vehicle tire tread of claim 11, wherein the vinyl content is between 55 wt. % and 65 wt. %.

13. The heavy vehicle tire tread of claim 4, wherein the silica is a highly dispersible silica.

14. The heavy vehicle tire tread of claim 4, wherein the composition includes no natural rubber.

15. The heavy vehicle tire tread of claim 4, wherein the composition includes essentially no carbon black.

16. The heavy vehicle tire tread of claim 4, wherein the tread is a truck tire tread.

17. The heavy vehicle tire tread of claim 16, wherein the tread thickness is between 10 mm and 19 mm before being worn.

18. The heavy vehicle tire tread of claim 4, wherein the organosilicon curing agent is selected from 3,3'-bis(triethoxysilylpropyl) disulfide, 3,3'-bis(triethoxy-silylpropyl) tetrasulfide, 3,3'-bis(triethoxy-silylpropyl) polysulfide or combinations thereof.

19. The heavy vehicle tire tread of claim 18, wherein the silica has a CTAB of between 140 $m^2/g$ and 180 $m^2/g$.

20. The heavy vehicle tire tread of claim 19, wherein the silica has a CTAB of between 150 $m^2/g$ and 170 $m^2/g$.

* * * * *